June 16, 1931.  C. A. LAWSON, SR., ET AL  1,810,140
DENTAL CABINET
Filed May 20, 1929   2 Sheets-Sheet 1
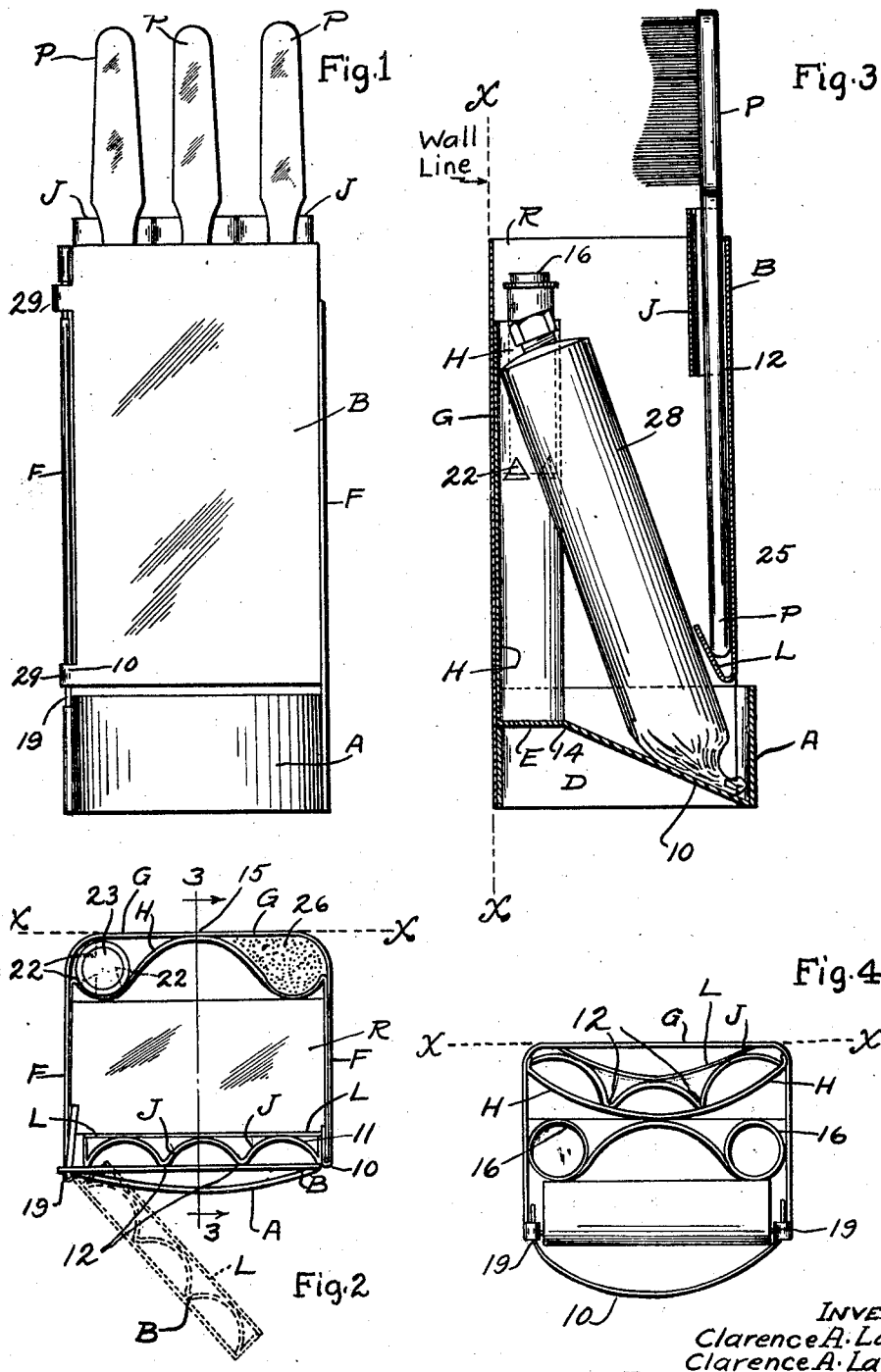
INVENTORS
Clarence A. Lawson, Sr.,
Clarence A. Lawson, Jr.,
By
ATTORNEY

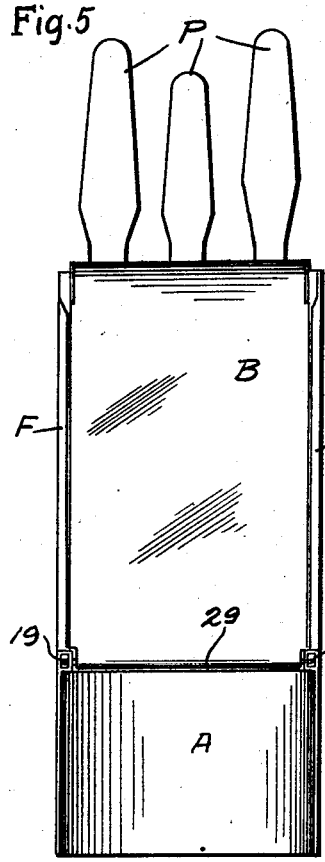
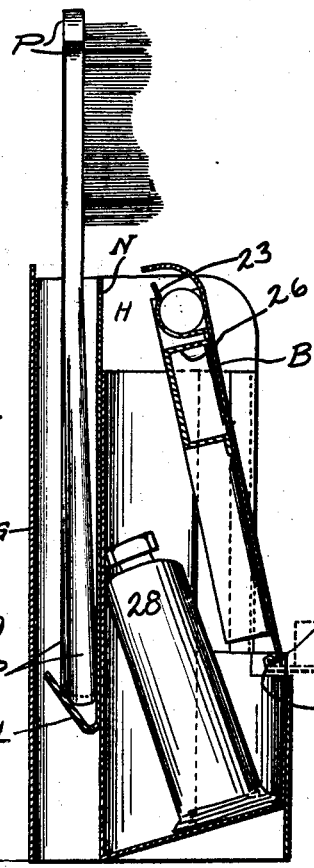
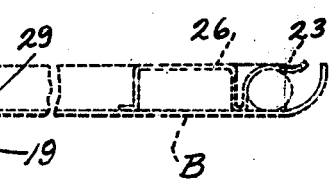
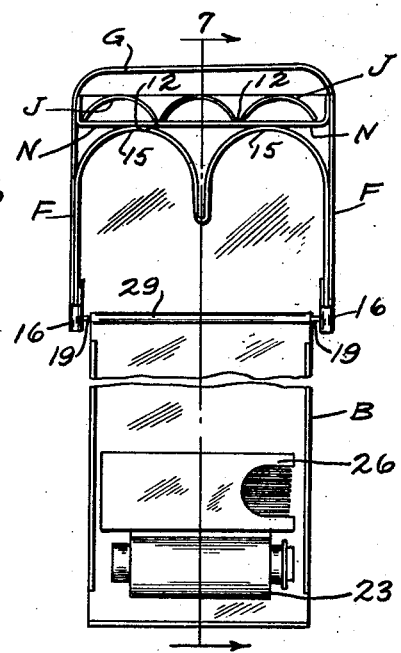
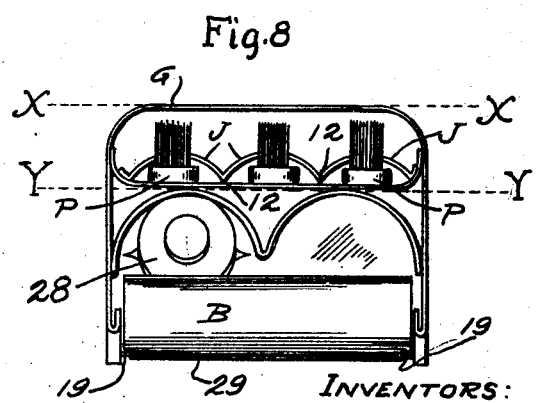

Patented June 16, 1931

1,810,140

UNITED STATES PATENT OFFICE

CLARENCE A. LAWSON, SR., AND CLARENCE A. LAWSON, JR., OF ALHAMBRA, CALIFORNIA

DENTAL CABINET

Application filed May 20, 1929. Serial No. 364,614.

This invention relates to improvements in containing receptacles or cabinets adapted to receive dental devices and materials, and more particularly suited for household or domestic use.

Its objects are to provide a holder or container of dental brushes, tooth-cleansing substances, tooth-picks, dental floss and similar devices and materials for cleansing and preserving the teeth, which will be low-cost and easily available for the usual family; adapted to maintain all of the brushes and other contents in a protected, sanitary and convenient aggroupment; which will, by its characteristics, induce cleanly dental habits; which will, by the position of its brush-holding means, prevent wear and cutting of the lowermost line of bristles; which will maintain the bristles free from external contacts; which will be economical of space and easily attached to a wall or placed on any article of furniture or packed for travel; so organized as to maintain definite separation of the individual brushes, and prevent contact between them and which will permit free ventilation of the container. Other objects will appear as this description proceeds.

In general, the container, or cabinet, is designed to fulfill a definite need which has gradually come with the general advance in civilization and knowledge of hygiene, together with the better understanding of the needs of caring for the teeth; for their own preservation and for promoting and maintaining general health.

As before recited, this invention includes the arrangement, whereby the aggroupment of all of the devices and materials in a compact, convenient and accessible package, and the consequent ease of performing not only the usual cleansing of teeth by brushing but more thorough attention by means of floss and picks, combined with some attractiveness of the cabinet itself, will induce the use of the facilities thus furnished.

In general, this invention comprises a small cabinet, preferably of thin metal and preferably given an external ornamental finish. The container has a door which closes the interior and the therein contained material or substances. Inside the container is a vertical, curved wall, or partition which forms a resting place for a dentifrice container or a plurality thereof. The bottom of the compartment is inclined so that any long object, such as a cylindrical tube, similar to ordinary tooth-paste containers, resting on the said inclined bottom, will be automatically caused to tilt, so that its upper end will rest against the said wall, or partition, preventing any tendency to fall outward. The individual containers for the several tooth-brushes are so fashioned and located that each brush is definitely separated from all of the others; each brush is set in a vertical position so that it will drain and dry most effectively, and the brushes are each supported by their downmost ends by a V-shaped trough-like support in which the lower ends of the brush handles rest and which constitutes the sole vertical support of the brushes, the bristles being all held well above every part of the compartment surrounding the brush, so that the weight of the brush is not carried by the bristles, but only by the lower end of the brush-handle. Preferably, some individual identification is placed on each of the brush holders, such as a number, letter, or any desired marking, by stamping or coloring.

With the above and other objects in view, this invention consists in the new and useful provision, formation, construction, combination and interrelation of parts, members and features, all as hereinafter disclosed, shown in the drawings and finally pointed out in claims.

In the drawings:

Fig. 1 is a front elevation of one of the preferred forms of this invention.

Fig. 2 is a plan of same showing opened door in dotted lines.

Fig. 3 is a vertical cross-section of same on line 3—3 of Fig. 2.

Fig. 4 shows a plan of a modified form of the invention.

Fig. 5 is a front elevation of a somewhat different form of the invention.

Fig. 6 is a plan thereof, showing the door open.

Fig. 7 is a vertical section of same on line 7—7 of Fig. 6.

Fig. 8 is a plan showing a further modification of the invention.

In the Figures 1 to 4 inclusive, A is a bottom front apron which, with the door B forms the front covering of the container. Door B is hinged at one side, F of the casing by any suitable means as a hinge whereof the pintle is 19 and made of a wire attached at its upper and lower ends to the container while the knuckles are made by forming projections 29 at the two left-hand corners of the door and bending them around the pintle, as shown.

Door B is a flat sheet of metal on the inner surface whereof are formed a plurality of compartments adapted to receive and surround tooth-brush handles. As indicated these are formed by bending a thin sheet of metal J into a plurality of curved sections—in this case three of them—and fastening the bent sheet J to contact with the flat plate B at the contact points 12 as well as at the ends of J.

The vertical length and disposition of J are as indicated in Figs. 1 and 3. The bent portion J, which forms the handle-surrounding compartments, extends downward only a portion of the length of the handles. Of course, instead of a single continuous sheet, the handle compartments can be made of a plurality of narrow strips bent as indicated in the plan view Fig. 2, and the shorter plurality of lengths as indicated by the dotted lines in the sectional elevation Fig. 3.

In any event, the uppermost edge of the compartment channels is positioned at an ample distance below the bristle heads of the brushes so that the lowermost row of bristles can never contact with the uppermost edge of the handle-surrounding compartments.

The vertical height of the brushes is fixed by the location of the V-shaped trough L, in which the handles P of the brushes rest. In this particular construction, the flat strip L, of thin metal, is fastened at its lower edge 17 to the inner surface of B, in any suitable manner (e. g., spotwelding.) The length of the strip L is just sufficient to extend across the width of the door B as shown. The object of forming the handle-supporting trough with a V-shaped cross-section is to adapt it for supporting handles of varying thicknesses. The width of opening at or near the top of the trough is greater than the thickness of any tooth-brush except unusual and peculiarly shaped ones. Also this shape of trough gives a spring-like hold of the diagonal member L on to the brush handles, as is obvious from the figure.

As indicated in the figures, the rear wall of the brush compartments is preferably at a higher elevation than the front wall thereof. The object of this construction is to render the placing of the tooth-brush handle into the compartment, more convenient and easy, especially for those who are near sighted and otherwise somewhat dependent on touch or position for identifying locations or receptacles and the like. With the front wall lower than the rear wall, the end of the tooth-brush handle may more easily be directed to its compartment, as is obvious.

Towards the rear of the cabinet is fastened a bent sheet of thin metal H which may take several different forms, in this case being made in the form of three reversed curves, all circular arcs. The middle portion, or arc, is of greater radius than the two others formed at each end of the sheet. The middle circular section of H may be fastened in position in any suitable manner. The larger middle curved wall or rear arch, is for the purpose of receiving any long object of comparatively small cross-section, specifically a dentifrice container such as are well known. A container of this character is shown in Fig. 3, leaning back against the rear partition or wall made by the bent sheet H. As indicated in Fig. 3, the bottom of the cabinet is formed with a slope, the elevation raising from the front at 10 to the rear at 14 so that a tube of the character described will naturally assume a leaning position towards the rear of the cabinet and have no tendency to fall out of the compartment.

Two additional tubular compartments are formed by the cooperation of the bent sheet H and the rear wall G of the cabinet. These occupy space which otherwise would not be of use as shown in the Fig. 2. In one of these tubular compartments an ordinary bottle, or tube, of dental floss is to be accommodated; in the other, tooth-picks are to be placed, as shown. Since the depth of the two smaller tubular compartments is too great for the length of the objects to be placed therein, a false bottom of some kind must be provided in these holders. Numerous methods of doing this are obvious and no specific manner of blocking off the bottom part of the compartments is claimed as a part of this invention. But as examples of possible methods of lifting the bottoms of the floss-containing tubes or the tooth-pick ends well above the bottom of the cabinet, a filling for a predetermined depth, with a plastic material which subsequently hardens (e. g., paraffine) or punching triangular fins out of the sheet metal H and bending them inwards of the tubes as indicated at 22, 22, in Figs. 2 and 3, are examples.

Obviously, the cabinet can be set inside the standard bath-room cabinet, or hung against the wall of a room or packed in any variety of travelling bag or receptacle. It is to be noted that if hung against a wall or laid in any travelling receptacle, the brush bristle heads will always be at some distance from any surface against which the cabinet may contact, there being ample clearance between bristles and supporting walls. In the figures, the dotted line X—X represents the line of the wall surface.

The use of the cabinet is clear from the figures and accompanying description. Opening the door B which swings outward around pintle 19 at the left-hand edge of the cabinet, the tooth-brushes are all exposed as are the inside compartments. The desired brush is removed by lifting it upwards until the lower end of the handle clears the upper edge of the compartment. Then the tube of tooth-paste or dentifrice is removed from the inside of the cabinet. Also, the tooth-picks and dental-floss are both easily accessible through the front door as is obvious.

The modification shown in Figs. 5, 6 and 7 is easily understood from the preceding explanation, though the location of the different parts is considerably changed from the arrangement just described. In this form, the door B is hinged to swing downwards to open, the pintle 19 lying transverse of the cabinet at the lower end of the door as shown. A single wide knuckle, 29, is formed by bending the bottom end of the door into a tube which surrounds the pintle. On the inner surface of the sheet metal door B are formed two compartments, 23 and 26, to hold a tube of dental floss and tooth-picks, respectively, as shown. These compartments are formed as in the preceding design by bending a piece of thin sheet metal H in the shape desired and fastening it to the inner surface of the door at points of contact, 12. The intermediate partition, or wall, against which the tubes of dentifrice lean, is, in this case, provided with two substantially vertical, concave depressions for the reception of two tubes, as shown, so that the entire space transversely across the cabinet is occupied by these receptacles.

Intermediate the rearmost wall G of the cabinet and the pair of tube-holding concave compartments, is positioned the plurality of handle-surrounding containers for the tooth-brushes, made by bending a sheet of thin metal J into the desired form and fastening the bent plate to contact with the intermediate vertical sheet N, at contact points, 12, thereby forming the individual handle compartments as shown. The same form of handle-supporting, V-shaped trough, formed by fastening the narrow strip L diagonally onto the inner surface of the intermediate plate N, and similar to that before described, is used in this cabinet and for the same purpose. The mode of use is the same as that for the first described cabinet.

Another variant is that shown in Fig. 4 which is a plan view of a form in which the door B lowers about a transverse pintle 19 at the lower end of the door which latter has a knuckle formed by bending the bottom end of the door around the pintle. From previous descriptions this construction is obvious. It is to be observed that the tooth-brush handle compartments are arranged relatively in curved plan.

Fig. 8 is still another form in which the brush-handle compartments are disposed at the rear of the cabinet and there are two dentifirice tube compartments nearer the front of the cabinet than are the tooth-brush compartments, the holders for the tooth-picks and dental floss tube being located on the inner surface of the door, similar to the arrangement depicted in Figs. 6 and 7.

While numerous variants of this invention are possible, it is to be observed that all forms have the following characteristics in common:

(1) Each tooth-brush is separated from its neighbor on either side by a definite wall.

(2) All brushes are held in an upright position.

(3) All brushes are supported on their bottom ends; not on the bristles.

(4) Tooth-paste or dentifrice tubes automatically lean towards the receptacle of the cabinet provided for them and have no tendency to fall out of the container.

(5) No matter how placed, packed or hung, the bristles of the tooth-brushes always clear the wall and make no contact with any surface against which the cabinet may rest.

(6) A single door gives access to all of the interior of the cabinet and to all of the devices and material therein contained.

(7) The arrangement of individual compartments is such that all space is used or useful, so that the cabinet is essentially compact, and small for the volume of the devices and materials which it is arranged to contain.

(8) Every form is cheaply produced as indicated in the several designs and accompanying descriptions here used to illustrate the general form of the device.

(9) Every design provides for containing all of the several kinds of devices and materials needed for complete tooth cleaning such as is done in the household.

Having described our invention in connection with illustrative embodiment, forms, proportions and arrangement of parts, it will be understood that many variants thereof are possible to those skilled in the art, and our invention, in its broader aspects, is not limited to the specific construction herein described and shown, as changes in the sizes, proportions, configurations, arrangements, assemblage, materials, juxtaposition and mechanical relations, as well as additions, omissions, substitutions, combinations and alterations for forms, parts, members and features, may be made without departing from the broad spirit of this invention.

Having thus disclosed our invention we claim and desire to secure by Letters Patent:

1. A device of the character disclosed, including a casing provided with separate brush holders, an angular support for the lower ends of the brushes adapted to grip the ends; the entirety being formed and arranged to maintain the brushes in upright position with the brush-heads spaced above such holders.

2. A device of the character disclosed, including a casing provided with separate brush holders formed and arranged to maintain the brushes in upright position with the brush-heads spaced above such holders, and an angular trough for supporting the brushes at their lower ends to retain same in alignment with the holders.

3. A device of the character disclosed, including a casing provided with separate brush holders formed and arranged to maintain the brushes in upright position with the brush-heads above such holders, and means for supporting the brushes at their lower ends to retain same in alignment with the holders; said casing having a compartment for reception of a dentrifrice container or the like.

4. A device of the character disclosed, including a casing provided with separate brush holders formed and arranged to maintain the brushes in upright position with the brush-heads spaced above such holders and projecting outside the casing, and means for supporting the lower ends of the brushes to retain same in alignment with the holders; said casing having a compartment for reception of a dentifrice container or the like, there being a movable closure for said casing upon which said brush holders and handle supporting means are mounted.

5. A device of the character disclosed, including a casing provided with separate brush holders formed and arranged to maintain the brushes in upright position with the brush-heads above such holders, and means for supporting the lower ends of the brushes to retain same in alignment with the holders; said casing having a compartment for reception of a dentifrice container or the like; said casing having an inclined bottom portion for disposing said dentifrice holder in inclined position within the casing.

6. A device of the character disclosed, including a casing provided with separate brush holders formed and arranged to maintain the brushes in upright position with the brush-heads above such holders, and means for supporting the lower ends of the brushes to retain same in alignment with the holders; said casing having a compartment for reception of a dentifrice container or the like; said casing having an inclined bottom portion for disposing said dentifrice holder in inclined position within the casing, and away from the casing opening through which access to the interior of the casing is had.

7. A device of the character disclosed, including a casing provided with separate brush holders formed and arranged to maintain the brushes in upright position with the brush-heads above such holders, and means for supporting the lower ends of the brushes to retain same in alignment with the holders; said casing having a compartment for reception of a dentifrice container or the like; said casing having an inclined bottom portion for disposing said dentifrice holder in inclined position within the casing, and away from the casing opening through which access to the interior of the casing is had, and a closure for said opening and provided with brush holders.

8. A device of the character disclosed, including a casing with an opening in the top thereof, and having a plurality of brush holders formed and arranged for maintaining the brushes in upright position with the bristle heads spaced above said holders and upper edge of said casing; said casing having a compartment for a dentifrice holder and the like.

9. A device of the character disclosed, including a casing having a plurality of brush holders formed and arranged for maintaining the brushes in upright position with the bristle heads above said holders; said casing having a compartment for a dentifrice holder and the like; said casing having an inclined bottom portion normally disposing such dentifrice in inclined position in the casing.

10. In a dental cabinet the combination of a container; a closure therefor; means for supporting a plurality of tooth-brushes in a substantially vertical position and providing a positive separation between brushes; said supporting means being positioned to hold the bristles of said brushes out of contact with any portion of the container; a concave receptacle for reception of dentifrice containers; an inclined bottom adapted to cause said containers to lean towards said receptacle.

11. In a dental cabinet the combination of a container; a closure therefor; means for supporting a plurality of tooth-brushes in a substantially vertical position and providing a positive separation between brushes; said supporting means being positioned to hold the bristles of said brushes out of contact with any portion of the container; a concave receptacle for reception of dentifrice containers; an inclined bottom adapted to cause said containers to lean towards said receptacle and additional receptacles for other dental accessories.

12. In a dental cabinet the combination of a container; a closure therefor; means for supporting a plurality of tooth-brushes in a substantially vertical position and providing a positive separation between brushes; said supporting means being positioned to hold the bristles of said brushes out of contact with any portion of the container; a concave receptacle for reception of dentifrice containers; an inclined bottom adapted to cause said containers to lean towards said receptacle and additional receptacles for other dental accessories, all of said holders and compartments being positioned to reduce to a minimum the size of the cabinet.

13. A dental cabinet comprising a container having a closure within which container are disposed compartments for tooth-brushes; others for dental floss, and for tooth-picks, and a substantially vertical concave compartment in said container for reception of a dentifrice container.

14. In a dental cabinet, the combination of a container; a closure therefor; compartments in the container for a plurality of tooth-brushes; a substantially vertical concave inner wall for reception of a dentifrice container; a compartment for reception of dental floss; a compartment adapted to receive tooth-picks; the walls of the said last two compartments being composed of the rear surfaces of the said concave inner wall.

15. In a dental cabinet, the combination of a container; a closure therefor; compartments in the container for a plurality of tooth-brushes; a substantially vertical concave inner wall for reception of a dentifrice container; a compartment for reception of dental floss; a compartment adapted to receive tooth-picks; the walls of the said last two compartments and that of the said concave inner wall being an integral member common to the three compartments.

In testimony whereof, we have signed our names to this specification at Los Angeles, Calif., this 11th day of May 1929.

CLARENCE A. LAWSON, Sr.
CLARENCE A. LAWSON, Jr.